(12) United States Patent
Weststrate et al.

(10) Patent No.: US 7,900,068 B2
(45) Date of Patent: Mar. 1, 2011

(54) MOBILE MULTI-MEDIA INTERFACE AND POWER PACK FOR PORTABLE ENTERTAINMENT DEVICES

(75) Inventors: Evan Weststrate, Norwood, MA (US); Mark B. Spitzer, Sharon, MA (US)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 723 days.

(21) Appl. No.: 11/901,267

(22) Filed: Sep. 14, 2007

(65) Prior Publication Data

US 2008/0072083 A1 Mar. 20, 2008

Related U.S. Application Data

(60) Provisional application No. 60/844,557, filed on Sep. 14, 2006.

(51) Int. Cl.
*G06F 1/26* (2006.01)

(52) U.S. Cl. ........................................ 713/310; 713/300

(58) Field of Classification Search .......... 713/300–324
See application file for complete search history.

(56) References Cited

U.S. PATENT DOCUMENTS

| | | | |
|---|---|---|---|
| 6,776,660 B1 * | 8/2004 | Kubota et al. | 439/607.17 |
| 2004/0266476 A1 | 12/2004 | Hogan | |
| 2006/0166705 A1 | 7/2006 | Seshadri et al. | |
| 2006/0166715 A1 | 7/2006 | Van Engelen et al. | |
| 2007/0093277 A1 * | 4/2007 | Cavacuiti et al. | 455/566 |
| 2007/0247794 A1 * | 10/2007 | Jaffe et al. | 361/681 |
| 2009/0182924 A1 * | 7/2009 | Lydon et al. | 710/304 |

* cited by examiner

*Primary Examiner* — Dennis M Butler

(57) ABSTRACT

A power supply and interface circuit assembly is used with a portable media player (PMP) to relay signals between the PMP and a peripheral device(s), such as a head-mounted display. A power supply in or attached to the assembly provides power to the circuitry, the PMP, and the peripheral device. The assembly is able to manage the charging and discharging of power to the PMP and the peripheral device and to manage multi-media signals between the PMP and the peripheral device to provide a complete, mobile interface assembly.

24 Claims, 5 Drawing Sheets

MOBILE MULTI-MEDIA INTERFACE AND POWER PACK FOR PORTABLE ENTERTAINMENT DEVICES

CROSS REFERENCE TO RELATED APPLICATIONS

This application claims the benefit under 35 U.S.C. §119(e) of U.S. Provisional Patent Application No. 60/844,557, filed on Sep. 14, 2006, the disclosure of which is incorporated by reference herein.

STATEMENT REGARDING FEDERALLY SPONSORED RESEARCH OR DEVELOPMENT

N/A

BACKGROUND OF THE INVENTION

In previous patent applications we have described the need for eyewear, facemask and other head mounted displays for interconnection to portable devices such as cell phones, DVD players and MP4 players such as the Apple iPOD. We call this entire class of portable electronic devices (including cell phones and PDAs) Portable Media Players (PMPs). There is at present, however, no easy way to integrate personal displays and other peripherals with PMPs.

Hsu has described a system of providing power to a PMP when in a motor vehicle (U.S. Pat. No. 6,842,356). Hsu's system connects the vehicle power to the PMP battery so as to charge the PMP battery. Grady has described a docking system in which the PMP battery may be recharged (U.S. Pat. No. 6,591,085). Additionally, a number of companies have created portable battery systems that attach to PMPs.

SUMMARY OF THE INVENTION

Ultimately personal display systems will be completely and seamlessly integrated with PMPs. However, there is presently a need for an easy way to integrate personal displays and other peripherals with PMPs. There is also a need for additional power to supply the PMP for longer playing times, as well as the need for power for the peripheral devices. There is also a need for integrated remote controls for the PMP and eyewear video system. The prior art systems have not contemplated the need for not only a rechargeable battery, but also the need to manage both the charging, discharging and to manage multi-media signals so that the user is provided with a complete, mobile interface assembly capable of attaching to other portable peripheral devices such as cameras and eyewear displays.

The present assembly provides a solution to the power problem and improved interconnectivity with peripherals and controls in one system. This assembly comprises integrated battery, logic and multi-media circuits that are packaged in a form that can be easily adapted to the PMP. This physical form, which can snap on or otherwise attach to the PMP, may be called a power supply and interface circuit assembly (PICA). The PICA preferably includes a power supply, such as a battery, preferably a rechargeable battery such as a Li-ion battery; a drive circuit for a peripheral device such as a camera, personal display, and/or audio; passive and active circuitry for relaying signals between the PMP and the peripheral device; and various sockets and connectors.

The assembly of the invention incorporates circuitry capable of (1) providing a more simple interface to peripheral devices including head-mounted or eyewear displays, (2) providing pass through for signals and logic, (3) intelligent charging circuitry, (4) wireless interface to peripherals, and (5) charge/discharge power management.

In one embodiment, a power supply and interface circuit assembly for use with a portable media player includes circuitry operable to relay signals between a portable media player and a peripheral device. A power supply connection is provided in communication with the circuitry to provide power to the circuitry, the portable media player, and the peripheral device from a power supply. A first input/output connection is in communication with the circuitry for connection to the portable media player. A second input/output connection is in communication with the circuitry for connection to the peripheral device. The circuitry, the power supply connection, and the first and second input/output connections are assembled in a portable package mountable to the portable media player.

DESCRIPTION OF THE DRAWINGS

The invention will be more fully understood by reference to the following detailed description of the invention in conjunction with the drawings, of which.

DETAILED DESCRIPTION OF THE INVENTION

Figure 1:
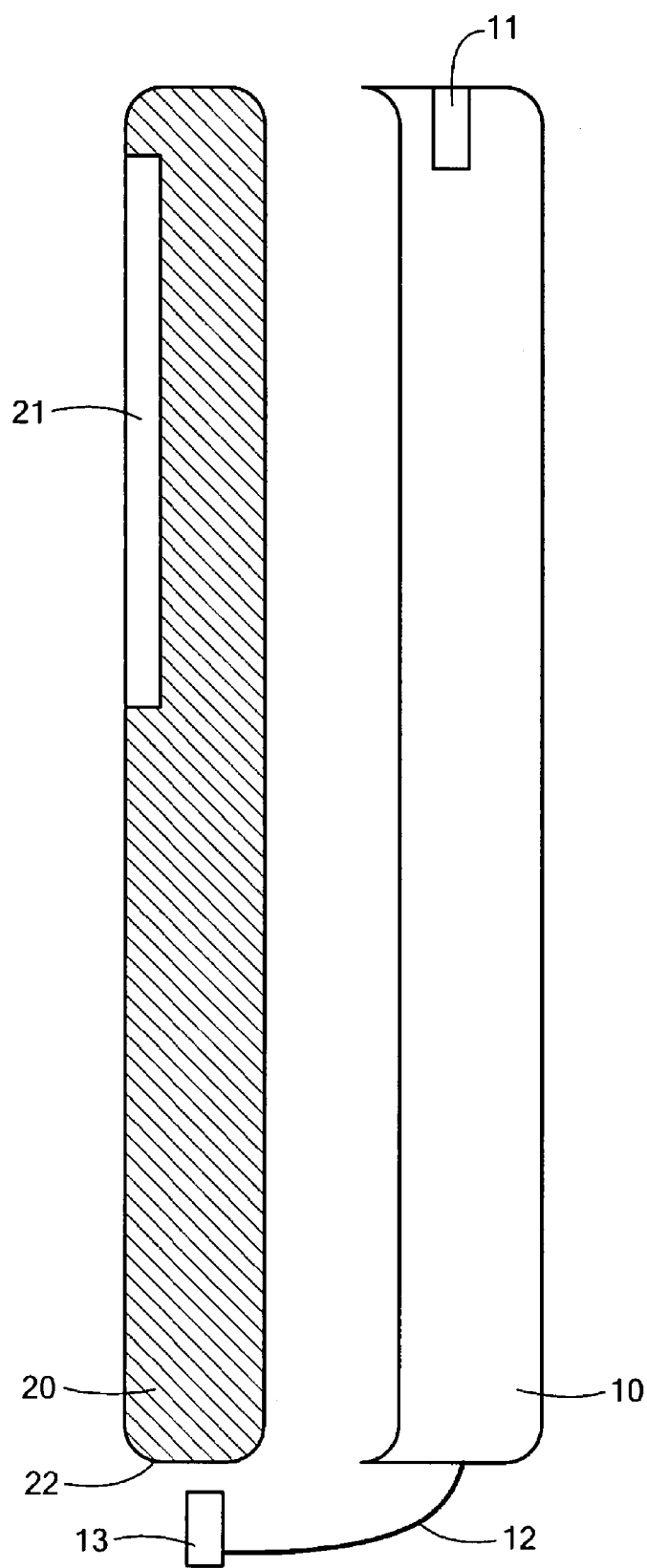
FIG. 1 is a schematic view of a power supply and interface circuit assembly (PICA) in association with a portable media player.

FIG. 1 illustrates the invention in conjunction with the Apple® iPod® brand portable media player (PMP) and myvu™ brand personal media viewer. The power supply and interface circuit assembly (PICA) 10 is assembled in a package configured to mount to the back of the iPod® PMP 20 for portability. The mount can be attained by any number of fastening devices, including tape, suction devices, hook and loop fasteners, or by the use of a protective cover which encloses both the iPod® PMP and the PICA and joins them physically together. The protective case may be clear or open in the area of the iPod® display 21 and at the multi-pin connector 22, as well as at the touch pad controls. The PICA can connect to the iPod® PMP using a cable and connector. The PICA may have an optional additional multi-pin connector 11 which emulates the function of connector 22 and permits other devices, such as a head-mounted display or personal media viewer, designed to be attached to connector 22 to be connected to the PICA. Alternatively, the connector 22 may be internal to the PICA to enable the cable connecting the PICA to the headset or other peripheral to be permanently connected to the PICA. The embodiment in FIG. 1, although shown specifically for the iPod® PMP, may be configured for other PMP products and is not limited to the iPod® PMP.

Figure 2:
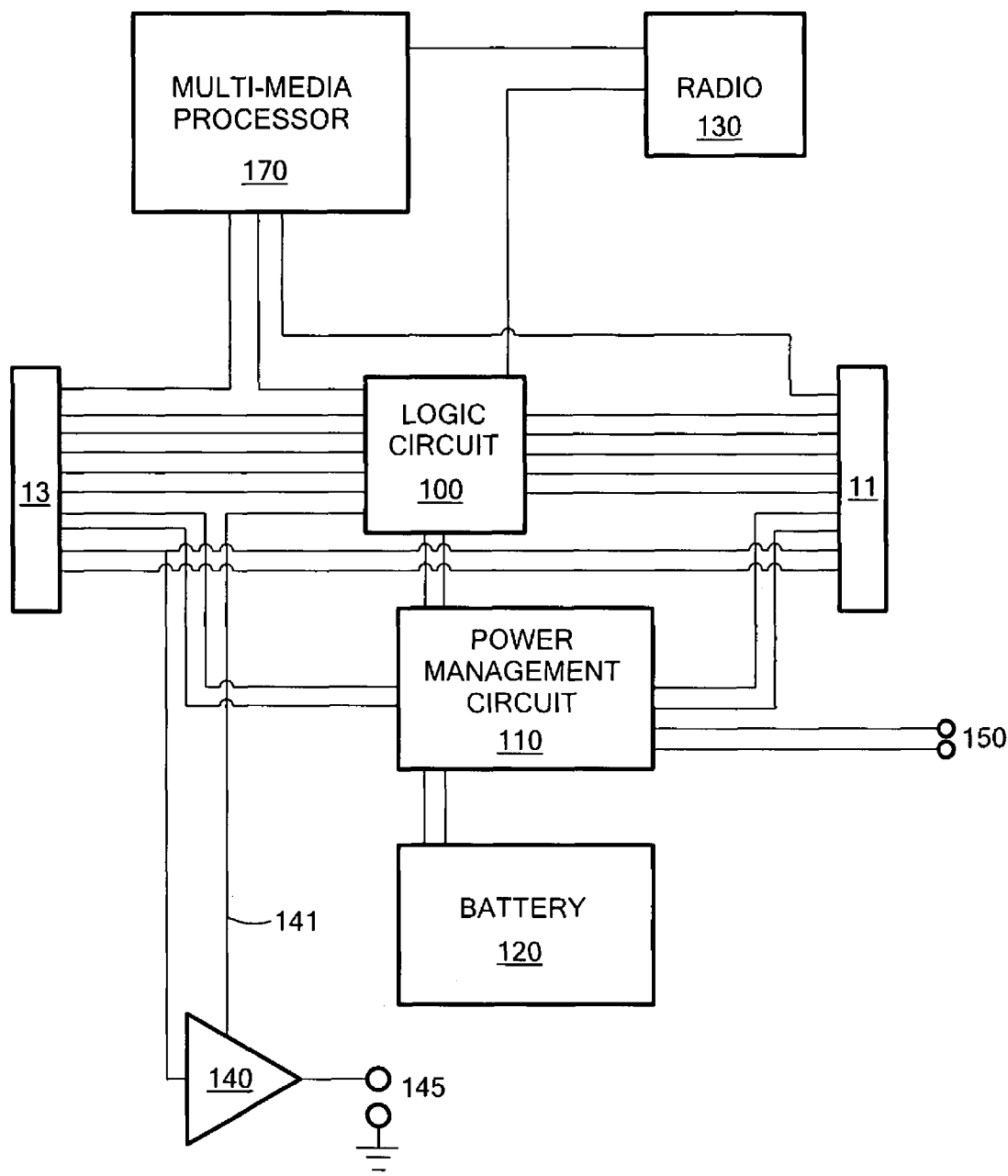
FIG. 2 is a schematic block diagram of the power supply and interface circuit assembly of FIG. 1.

As illustrated in the block diagram in FIG. 2, internally, the PICA is wired to permit some or all of the connections in the input/output connector 13 to be passed through to the input/output connector 11. A microprocessor or logic circuit 100 may be used to interrupt logic commands, re-interpret them, and/or change the nature of the logic commands. Such changes may be necessary owing to the way the various devices (including the PMP, PICA, head-mounted display or other peripheral device) identify themselves to each other. For example, the identity information passed to the PMP would differ depending on whether or not the head-mounted display were to be connected to the PICA. Security and/or proprietary identity information may also be passed from the PICA to the PMP. Such information may be derived from proprietary authentication integrated circuits provided by the PMP manufacturer.

The logic circuit also interprets loudness commands from either the PMP or the peripheral device to adjust the gain of an audio amplifier 140 which may connect to an external headphone jack 145. The audio amplifier 140 may also be used to change the audio level from line level to headset level or to other levels. The audio circuit is in communication with the logic circuit through a connection 141 which is representative of logic control of all of the audio and video amplifiers that may be present in the PICA. Although one channel is shown in FIG. 2, two amplifiers may be used for stereo.

The PICA also includes a suitably connected power supply, preferably, a battery 120, and a power management circuit 110, which also regulates charging and discharging of the battery. The battery 120 may supply power to all systems within the PICA as well as to the PMP through connector 13 and the peripheral device through connector 11. The logic circuitry 100 and power management circuit 110 are designed to utilize a number of charging modes so that if power is available to the PICA through connection 150, the power may be used to charge the PMP battery, the internal battery 120 or to power all of the systems including the PMP, peripheral device and PICA. If power is provided at one of the connectors 13, 11, the power may be used to charge the battery 120, or run the PICA and peripherals. The charge state of the battery may be provided by a suitable visible or audible indication or indicator element, such as on LEDs or on a small LCD on the surface of the PICA. The LEDs (or LCD) are connected to the logic circuit 100 or power management circuit 110. In order to save power, the LEDs may be connected through a momentary push button switch so that they are illuminated only when the user desires to read the charge state of the battery.

Additionally, various battery charging situations can require negotiation between the PICA, the PMP and other peripherals to determine which battery is charging, and which battery is powering the PMP and peripherals. This requires a microprocessor or other logic circuit in the PICA to mediate the flow of data.

Connection point 150 may be in any form including universal serial bus connectors (USB), firewire connectors or other jacks commonly used for external power. The system (comprising the PICA, PMP and peripherals) may be recharged by either a conventional battery charger, or from the power connections provided by USB, firewire, or the like. In embodiments such as USB, the data capability of the USB connection is passed through to the connectors 11, 13 so that the PMP is connected to a data stream (for example from a computer) for downloading audio or video content, and the power from the USB connection is shared via the PICA circuits with the PMP and other peripherals.

FIG. 2 shows an optional multi-media processor 170 that interprets audio and video signals from the PMP (via interconnect 13) or from a peripheral via interconnect 11 or via the USB or other digital connection. The peripheral device may be a camera. The multi-media processor 170 is in communication with the logic circuit 100 so that the processor 170 can be configured to pass processed audio or video data in the appropriate direction with the appropriate processing. The processing includes analog-to-digital or digital-to-analog conversion, matching of video formats, signal amplification, and other functions (such as impedance matching, signal compression and decompression, game playing software, and interfacing with other devices, such as a keyboard or joystick) necessary at the interface of a PMP and peripheral device. In the case where the peripheral device is a head mounted or eyewear display, the multi-media processor 170 provides the required drive signals for the display. If neither a multi-media processor nor other audio and video signal handling circuitry is used in the PICA, the audio and video signals are passed straight through from connector 11 to connector 13.

In a further optional enhancement to the PICA shown in FIG. 2, the multi-media processor 170 and/or logic circuit 100 is in communication with a radio 130, such as a Bluetooth radio, for wireless digital input and output. The Bluetooth or other wireless transceiver may include further image processing circuitry including compression or decompression (or alternatively, signal compression and decompression can be carried out in the multi-media processor 170). In the embodiment in which the peripheral device is an eyewear display, the signal is sent to the display in the manner that has been described in U.S. Pat. Nos. 6,091,546 and 6,349,001.

Figure 3:
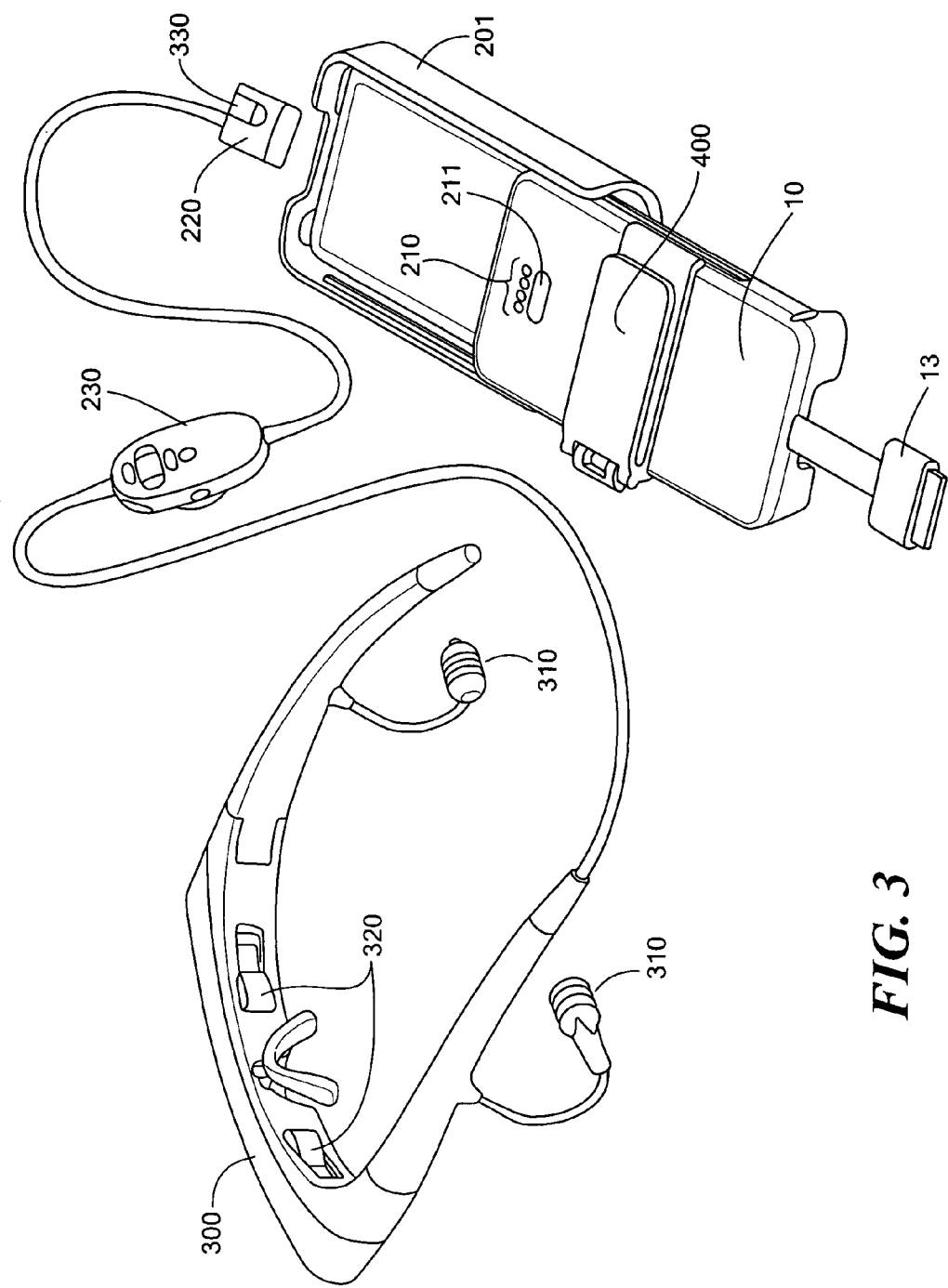
FIG. 3 is an isometric view of the power supply and interface circuit assembly of FIG. 1 in use with a portable media player and a personal display peripheral device.

FIG. 3 illustrates a preferred embodiment of the invention in which the PMP is an Apple® iPod® brand music and video player and the peripheral device is an eyewear display 300. The PICA system 10 is joined to the iPod® PMP mechanically by a protective cover or sleeve 201. The connector 13 is configured to plug into the 30-pin connector on the iPod® PMP. The PICA contains a rechargeable battery, and the charge state of the battery is monitored by LEDs 210 visible through the back of the PICA. In order to save power, the LEDs are only illuminated when button 211 is pressed by the user.

A plug 220 connects to the input/output connector 11 on the PICA (not shown in FIG. 3). The connector 11 provides the eyewear with audio and video signals from the iPod® PMP as well as power from the battery 120. Logic commands (play, stop, and so forth) are generated by the user on a keypad 230 and are relayed through the plug 220 and connector 11 to the PICA, which then relays the commands to the iPod® PMP. Keypad 230 and its associated electronics may be located at any point along the cable connecting the eyewear to the PICA, or may be located in either the PICA or the eyewear itself, or both. Note also that the PICA system logic identifies the presence of an external display and battery to the iPod® PMP. The eyewear display 300 receives the audio which is delivered to the user through earphones 310 and video is delivered through optics 320. A belt clip 400 is provided so that the user may wear the system on a belt in on-the-go applications. Alternatively, the PICA may be provided with a lanyard loop so that it can be suspended from the neck. This is particularly useful for small, lightweight PMPs.

In the embodiment shown in FIG. 3, power is provided to the PICA system through connection 330 which is in this case mounted on the multi-pin plug 220. Thus power is supplied to the PICA through the connector 11 which mates to the plug 220. The plug 220 may also be connected directly to the iPod® PMP in order to provide power to the peripheral eyewear display and to the iPod® PMP, without using the PICA. This makes possible separate charging of the PICA battery while the iPod® PMP and eyewear are in use in a separate location.

Figure 4:
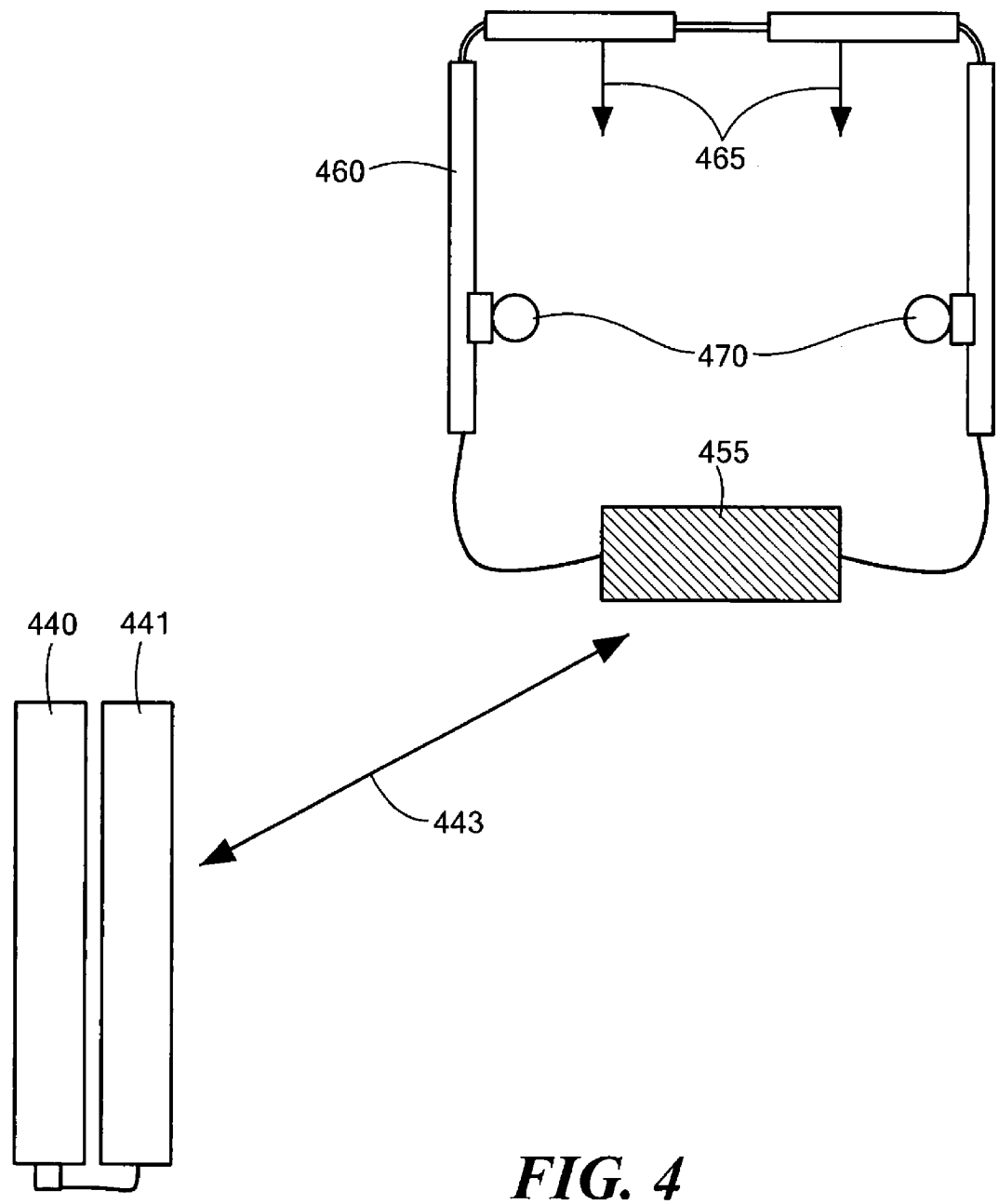
FIG. 4 is a schematic view of a further embodiment of the power supply and interface assembly employing a wireless link to the peripheral device.

FIG. 4 illustrates the use of the radio to create a wireless link between the PICA 441 and an eyewear display 460. The PICA is connected to an iPod PMP 440. The radio waves 443 propagate between the PICA 441 and a transceiver 455 in, on or attached to eyewear 460, as described in U.S. Pat. No. 6,091,546. Light rays 465 emanating from the eyeglass lenses and constituting an image are provided to the user's eyes, and sound is provided to the user's ears through earphones 470.

Figure 5:
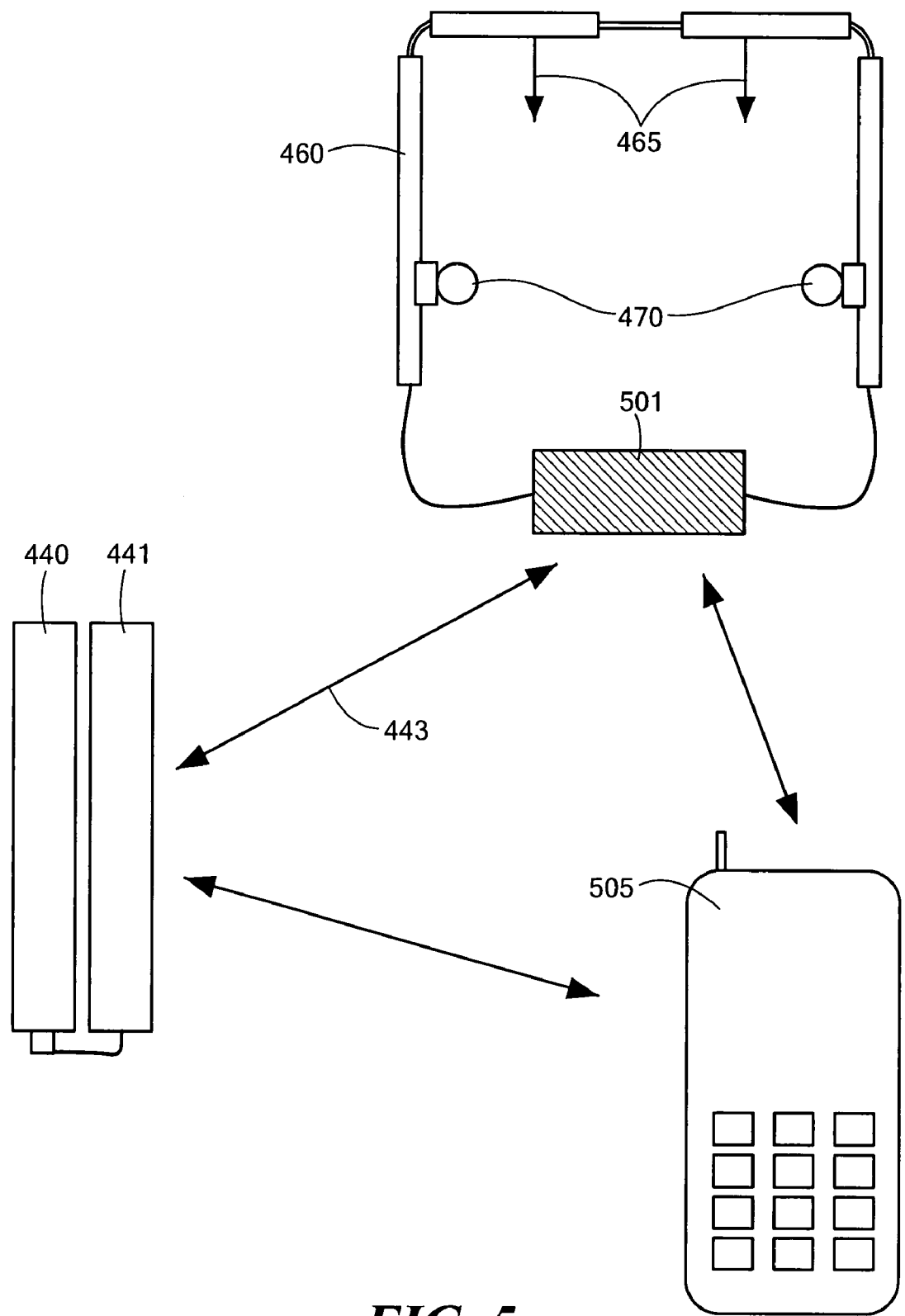
FIG. 5 is a schematic view of a still further embodiment of the power supply and interface assembly further employing a radio wave receiver or receiving a television broadcast.

A further improvement of the system can be attained by including a radio wave receiver that receives television broadcasts, as shown in FIG. 5. The television signal may be transmitted in any number of ways including conventional analog TV, digital high definition TV, or a method know as direct video broadcast to handsets (DVB-H). In any of these cases, the TV receiver may be located in the PICA 441 or in the transceiver 501 (FIG. 5). The iPod® PMP may be used to store television programs. For TV signals in which a password or other encryption key is needed for decoding, a handset 505 may be in contact with the PICA or the headset in order to purchase the decryption key, and any of these units may be used to decode the broadcast so that it may then be sent as a video signal to the eyewear.

One or more additional connectors similar to the connector 11 can be provided to connect one or more additional peripheral devices, such as a second headset, a keyboard, or a game playing device.

The invention is not to be limited by what has been particularly shown and described, except as indicated by the appended claims.

What is claimed is:

1. A power supply and interface circuit assembly for use with a portable media player, comprising:
    circuitry operable to relay signals between a portable media player and a peripheral device, the peripheral device comprising a head-mounted display;
    a power supply connection in communication with the circuitry to provide power to the circuitry, the portable media player, and the peripheral device from a power supply;
    a first input/output connection in communication with the circuitry for connection to the portable media player; and
    a second input/output connection in communication with the circuitry for connection to the peripheral device; and
    the circuitry, the power supply connection, and the first and second input/output connections are assembled in a portable package mountable to the portable media player, and the circuitry is operable to relay signals to the head-mounted display.

2. The assembly of claim 1, further comprising a video amplifier in communication with the circuitry.

3. The assembly of claim 1, wherein the peripheral device further comprises a camera, and the circuitry is operable to relay signals to the camera.

4. The assembly of claim 1, wherein the peripheral device further comprises an audio element, and the circuitry is operable to relay signals to the audio element.

5. The assembly of claim 1, wherein the circuitry is further operable to control power to the portable media player and the peripheral device.

6. The assembly of claim 1, wherein the circuitry is further operable to regulate charging and discharging of the power supply.

7. The assembly of claim 1, wherein the circuitry is further operable to regulate charging and discharging of power for the portable media player.

8. The assembly of claim 1, wherein the circuitry is further operable to regulate charging and discharging of power for the peripheral device.

9. The assembly of claim 1, wherein the circuitry is further operable to mediate flow of data among the power supply, the portable media player, and the peripheral device.

10. The assembly of claim 1, further comprising an indicator element to provide a signal indicative of a charge state of the power supply.

11. The assembly of claim 1, further comprising an internal or an external power supply connected to the power supply connection.

12. The assembly of claim 1, further comprising an internal power supply comprising a battery, a fixed battery, a replaceable battery, a rechargeable battery, or a Li-ion battery.

13. The assembly of claim 1, further comprising a connection to an external power source.

14. The assembly of claim 1, further comprising a cover enclosing the assembly and the portable media player.

15. The assembly of claim 1, further comprising means for mounting the assembly to the portable media player.

16. The assembly of claim 1, further comprising a processor in communication with the circuitry, the processor operable to process audio data, video data, or audio and video data from the portable media player and the peripheral device.

17. The assembly of claim 16, wherein the processor is operable to drive the peripheral device.

18. The assembly of claim 1, wherein the circuitry further comprises a logic circuit to process logic commands between the portable media player and the peripheral device.

19. The assembly of claim 1, wherein the first input/output connection and the second input/output connection are in communication with each other.

20. The assembly of claim 1, wherein the circuitry comprises a wireless transceiver, or a radio or television receiver.

21. The assembly of claim 1, further comprising a user input device in communication with the circuitry.

22. The assembly of claim 21, wherein the user input device further comprises commands for controlling the portable media player.

23. The assembly of claim 1, further comprising an audio amplifier in communication with the circuitry.

24. The assembly of claim 23, wherein the audio amplifier is connectable to an external headphone jack.

* * * * *